Figure 1:
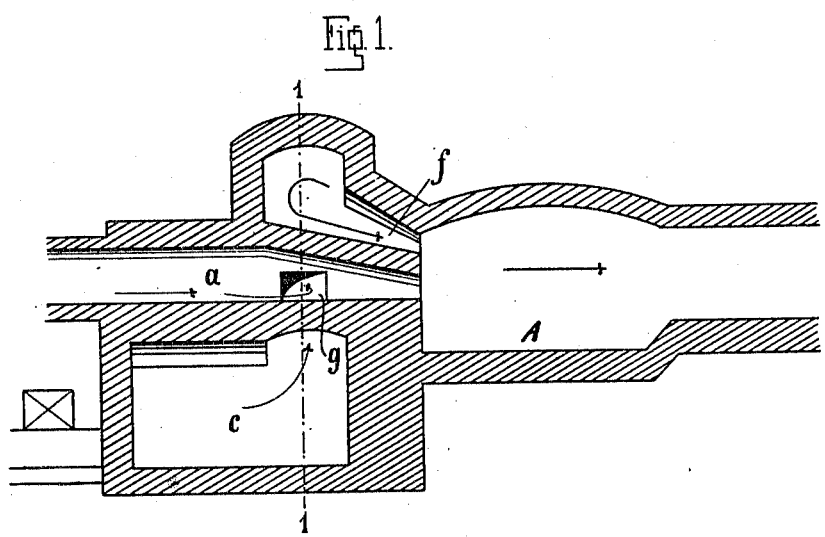

F. SIEMENS.
REGENERATIVE FURNACE.
APPLICATION FILED NOV. 22, 1913.

1,102,359.

Patented July 7, 1914.
7 SHEETS—SHEET 1.

Witnesses:
B. Dommers
E. Leckert

Inventor
Friedrich Siemens,
By [signature] Atty.

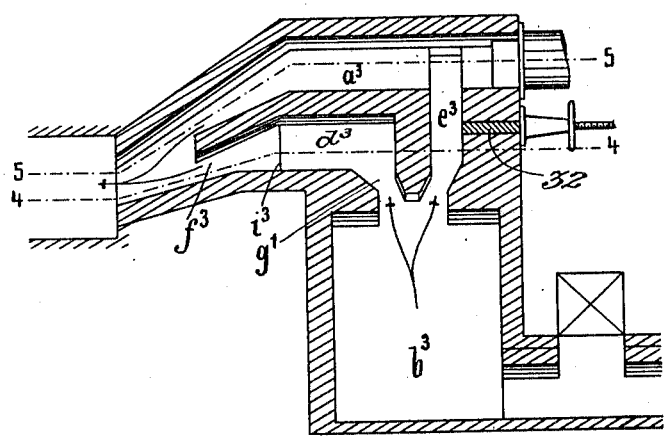
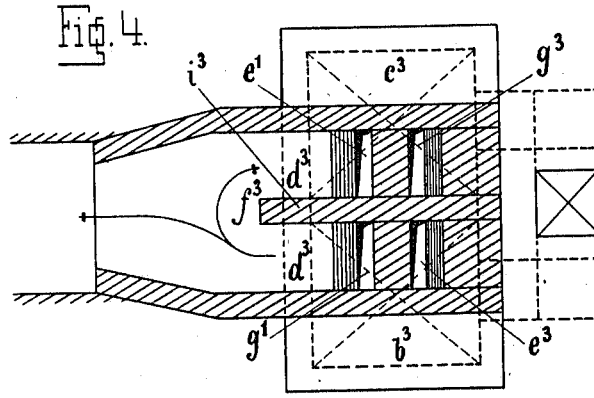
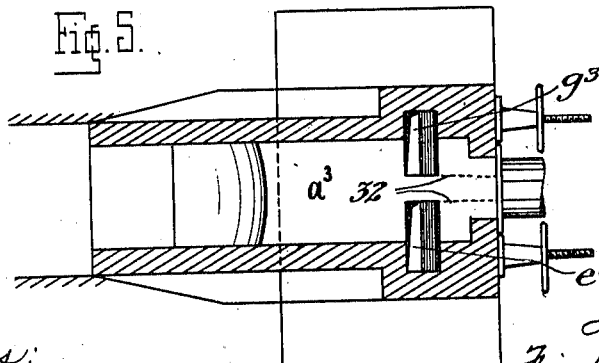

F. SIEMENS.
REGENERATIVE FURNACE.
APPLICATION FILED NOV. 22, 1913.
1,102,359.
Patented July 7, 1914.
7 SHEETS—SHEET 3.
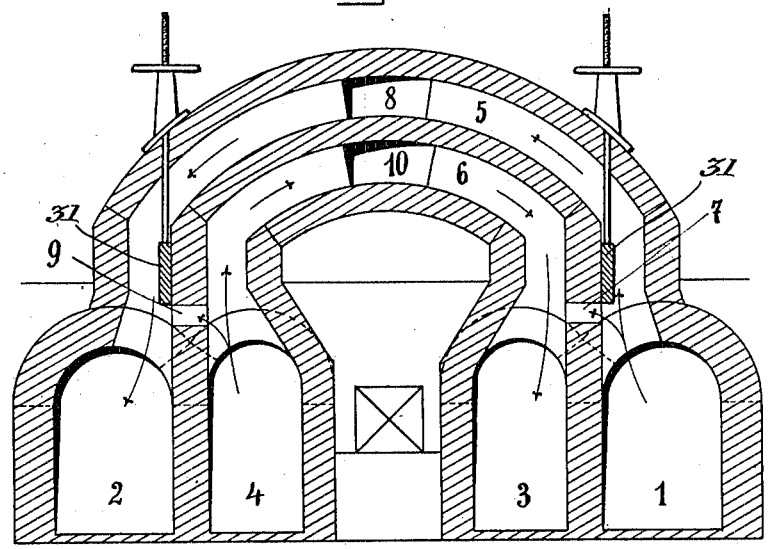
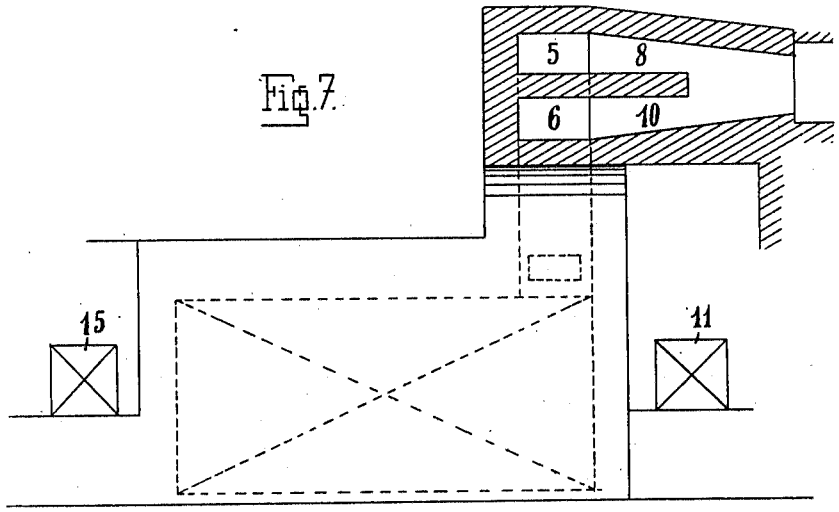

F. SIEMENS.
REGENERATIVE FURNACE.
APPLICATION FILED NOV. 22, 1913.
1,102,359.
Patented July 7, 1914.
7 SHEETS—SHEET 4.
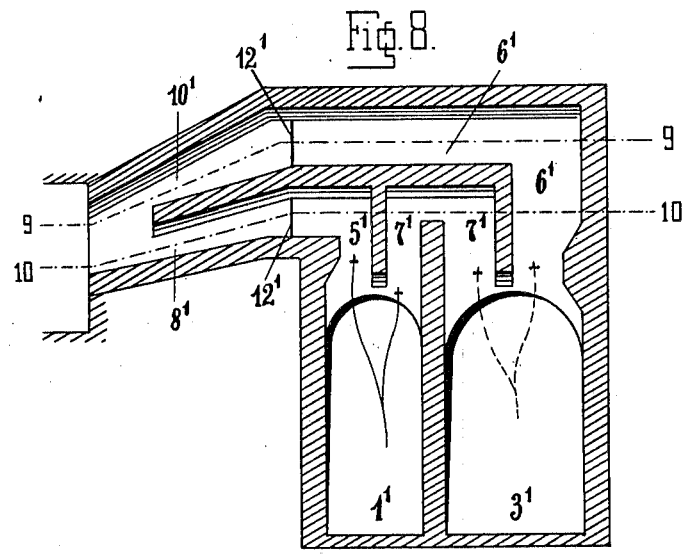
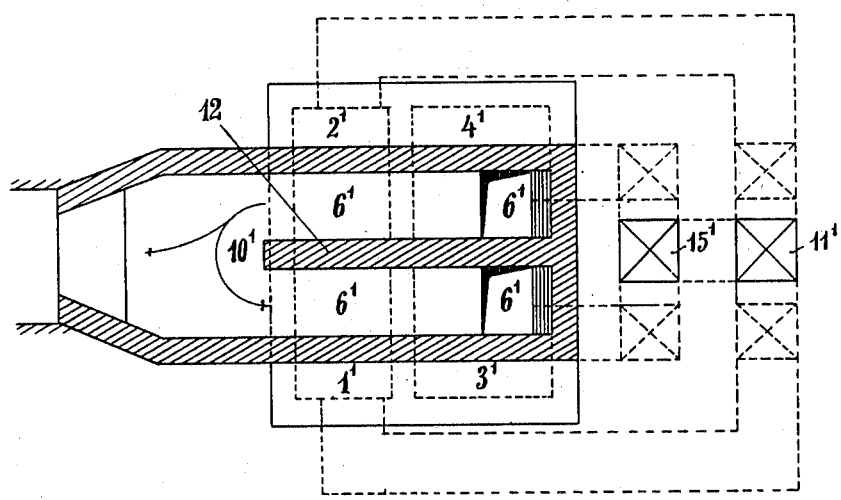

F. SIEMENS.
REGENERATIVE FURNACE.
APPLICATION FILED NOV. 22, 1913.

1,102,359.

Patented July 7, 1914.

7 SHEETS—SHEET 5.

Witnesses
P. Sommers.
E. Leckert.

Inventor
Friedrich Siemens,
By Henry Orth Jr
Atty

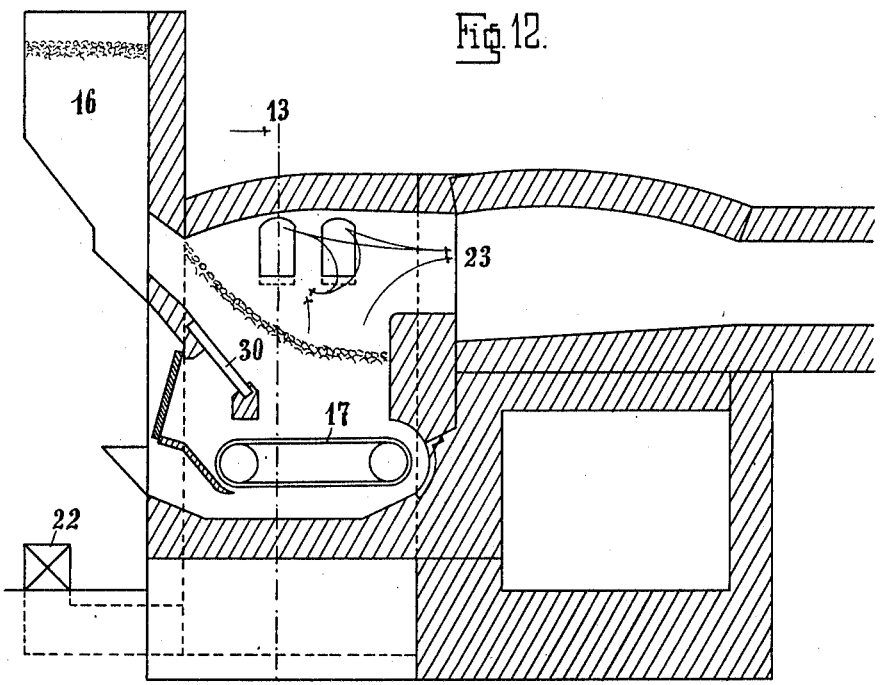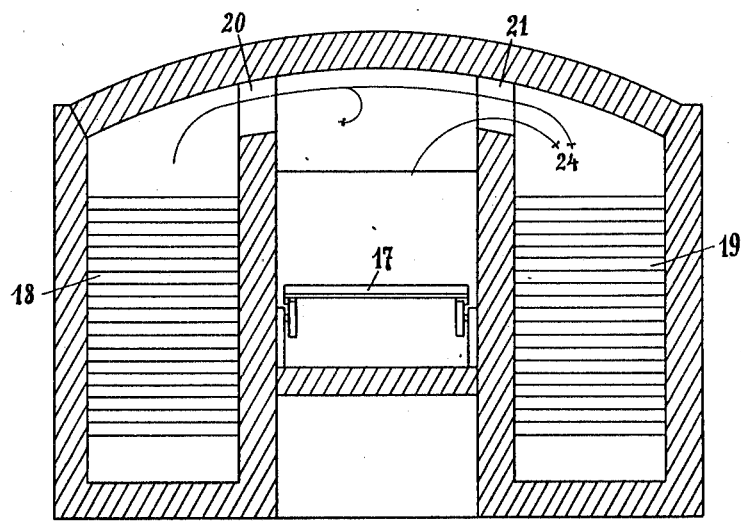

F. SIEMENS.
REGENERATIVE FURNACE.
APPLICATION FILED NOV. 22, 1913.
1,102,359.
Patented July 7, 1914.
7 SHEETS—SHEET 7.
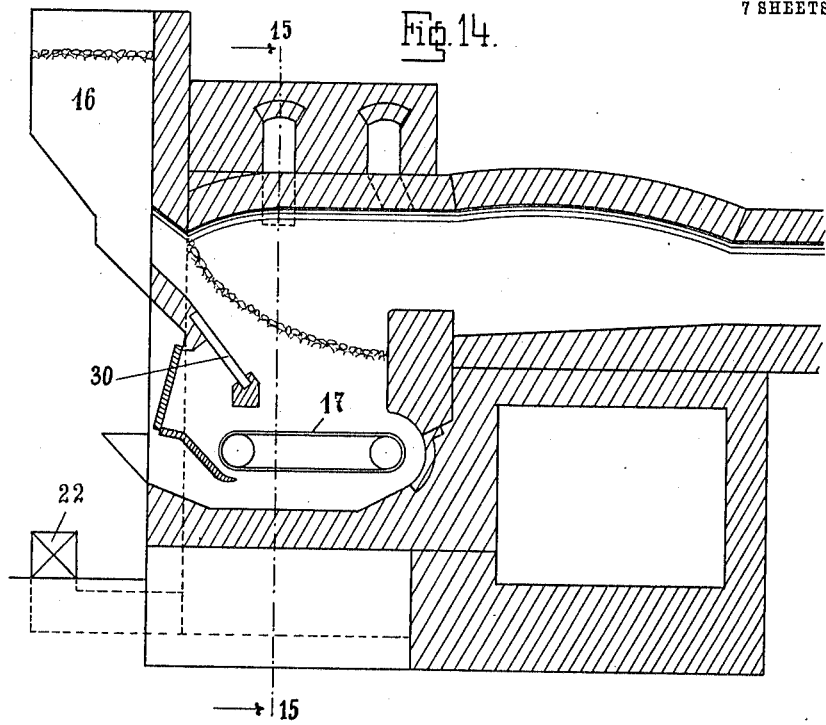
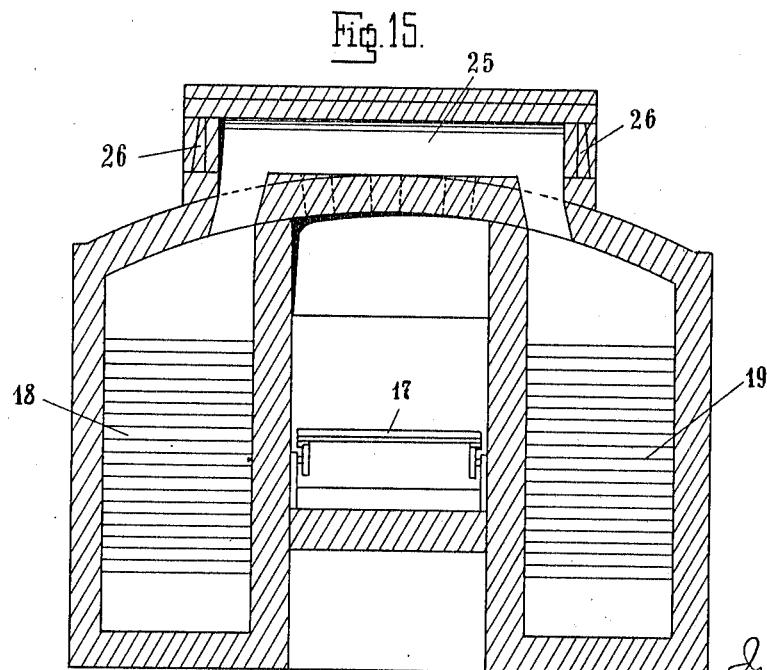

UNITED STATES PATENT OFFICE.

FRIEDRICH SIEMENS, OF BERLIN, GERMANY.

REGENERATIVE FURNACE.

1,102,359. Specification of Letters Patent. Patented July 7, 1914.

Application filed November 22, 1913. Serial No. 802,458.

*To all whom it may concern:*

Be it known that I, FRIEDRICH SIEMENS, a citizen of the German Empire, residing at Berlin, in the Kingdom of Prussia, Germany, have invented certain new and useful Improvements in Regenerative Furnaces; and I do hereby declare the following to be a full, clear, and exact description of the invention, such as will enable others skilled in the art to which it appertains to make and use the same.

My invention relates to improvements in furnaces of the regenerative or recuperative type, and more particularly in furnaces in which the flame must always be conducted through the heating or hearth chamber of the furnace in the same direction, independently of the regenerator which is being used for heating the air or gas. As is known in the art, this is necessary for example in furnaces in which goods to be heated are advanced over the hearth from one side to the opposite one, in roasting furnaces, in rotating furnaces, etc. In order to obtain in such furnaces a flame of uniform direction, it has been proposed for example to use a part of the flame exclusively for heating the furnace and to use the remaining part for heating the regenerators. By properly disposing the flues the flame can be reversed as desired without changing the direction of the flow of the heating gases through the heating chamber of the furnace.

The object of my present improvements is to provide a furnace of this class in which the flame is thus divided without providing openings and their opening or closing means such as valves, or the like, and exclusively by properly regulating the draft of the stack at the discharge ends of the hearth and the regenerators respectively.

With this object in view my invention consists in so arranging the passages for the air and gas, that the flame for heating the furnace and the regenerator is divided before it is being formed, or in other words, the currents of air and gas are divided before they are admitted to the heating chamber of the furnace.

In the practice of the invention the gas and air passages are connected with each other by apertures or passages before their discharge ends into the furnace, so that according to the pressure, or the draft at the discharge from the hearth and from the regenerator the currents of gas and air are branched in such a way, that the main body of the gas and air results in a flame for the furnace which has under any circumstances the same direction, while the branch currents produce flames which are used for heating the regenerators or, if desired, apart from this, for starting the combustion of the furnace flame.

Various constructions may be provided for putting the invention into effect. In many cases, for example where the gases are supplied in a hot state, it will be sufficient to preheat only the air. In such cases the passages for the air and gas are preferably branched in such a way, that a small amount of fresh air is conducted through a branch passage into the gas passage in order to start combustion. Otherwise the current of air is divided in such a way, that the main body is admitted to the furnace, while a part is admitted together with air to the regenerator for heating the same.

Where comparatively cool gases are used, such for example as gases coming from a high furnace, also the gases must be conducted through regenerators, in order to heat the same to the desired temperature. In this case the branches or connections between the air and gas passages are made in such a way, that, apart from the flame for the furnace, the direction of which always remains the same, special flames are produced for heating the different regenerators.

My invention may be embodied in furnaces in which the gaseous fuel is directly supplied to the furnace from an outer source, or in such furnaces in which the gaseous fuel is produced within the furnace from solid fuel.

For the purpose of explaining the invention several examples embodying the same have been shown in the accompanying drawings, in which the same letters of reference have been used in all the views to indicate corresponding parts.

Figure 2:
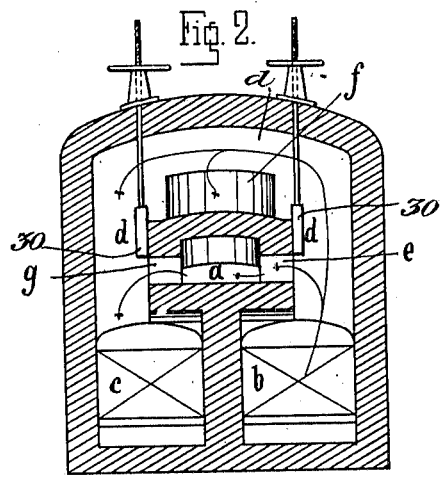
Figure 10:
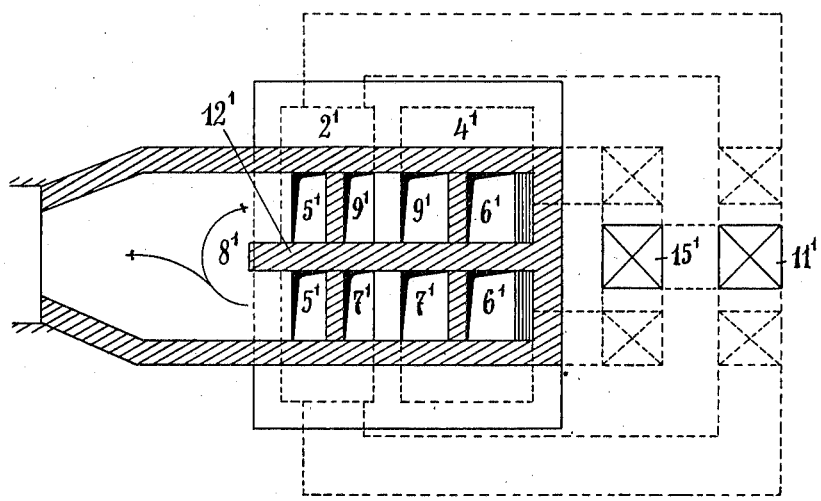
Figure 11:
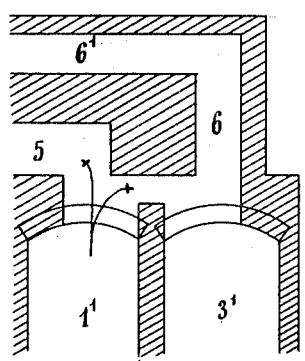

In said drawings—Figure 1, is a longitudinal section of the furnace, Fig. 2, is a cross-section taken on the line 1—1 of Fig. 1, Figs. 3, 4 and 5, are respectively a longitudinal section and two horizontal sections taken on the lines 4—4 and 5—5 of Fig. 3 and showing a modification of the furnace, Figs. 6 and 7, are respectively a vertical cross-section and a longitudinal section of a further modification of the invention, Figs. 8, 9 and 10, are respectively a longitudinal section and two horizontal sections taken on the lines 9—9 and 10—10 of Fig. 8 and illustrating a further modification, Fig. 11, is a modification of the furnace shown in Fig. 8, Fig. 12, is a longitudinal section of a furnace in which the gaseous fuel is produced on a fire place from solid fuel, Fig. 13, is a vertical cross-section of Fig. 12 taken on the line 13—13, Fig. 14, is a longitudinal section similar to that shown in Fig. 12 and showing a modification of the furnace, and Fig. 15, is a vertical cross-section of Fig. 14 taken on the line 15—15.

Referring to the example illustrated in Figs. 1 and 2 of the drawings, the gas is always admitted to the furnace through a median passage $a$. Therefore the direction of the flow of the gas is not reversed but that of the flow of the air, which is alternately preheated in generators $b$ and $c$. It may be assumed, that the preheated air from the generator $b$ flows upward within an air passage $d$ and in the direction of the arrow shown in Fig. 2. The said current of air is divided into three branches, one part flowing through a passage $e$ and into the gas passage $a$ where it starts the combustion. The remaining part of the air flows farther upward within the passage $d$, until a second part is branched off at the vertex of the air passage $d$ and gets through a flue $f$ into the hearth chamber A of the furnace, where it combines with the current of gas mixture from the gas passage $a$ to form the heating flame for the furnace the direction of which remains the same in the whole operation of the furnace. The third part of the air flows downward through the second branch of the air passage $d$, and it receives a supply of fresh gas coming from the gas passage $a$ through a by-pass $g$, which gas is burnt and heats the regenerator $c$. After reversing the supply of air the same operation takes place symmetrically and in the opposite direction. The air comes from the regenerator $c$, a part thereof flows through the passage $g$ and into the gas passage $a$ for starting combustion, a second part is admitted through the flue $f$ to the hearth chamber of the furnace, and the third part is added to the gas flowing through the passage $e$ and burns the same so as to heat the regenerator $b$. It appears therefore, that the flame of the furnace always has the same direction, and that no valves are provided which are exposed to the influence of the flame. The furnace is advantageous also in this respect, that it is equipped with a single reversing valve. It will readily be understood, that the operation may also be reversed, and that the air may be admitted to the furnace through a passage in which its direction is not altered, while the gas is divided into three branches.

The flame for starting combustion which is produced by admitting air to the current of gas through the passages $e$ or $g$, may be omitted. If this is preferred, the by-passes $e$ and $g$ are equipped with valves 30 for closing the same, the passage $e$ being closed while the current of air is flowing in the direction indicated by the arrows, and the passage $g$ being closed while the current of air is flowing in the opposite direction.

The example illustrated in Figs. 3 to 5 is distinguished from the example so far described by the different position of the air passage.

While in the example shown in Figs. 1 and 2 the air passage $d$ is disposed vertically to the gas passage $a$ which is arranged substantially horizontally, in the example shown in Figs. 3 to 5 the air passage is substantially parallel to the gas passage and it is located below the same.

In the example shown in Figs. 3 to 5 the gas is always flowing in the same direction through a gas passage $a^3$, in the same way as has been described with reference to Figs. 1 and 2. But the said gas passage is located in the top part of the furnace. The preheated air which moves upward from the regenerators gives off a small part of its volume immediately after leaving the regenerators, which part is admitted through a vertical passage $e^3$ to the gas passage $a^3$, where it starts the combustion of the main body of gas, as has been described with reference to Figs. 1 and 2. The remaining part of the preheated air continues its flow through a passage $d^3$ which is bent at a right angle and is located with its larger part parallel to the gas passage $a^3$ and below the same. Thereupon the air moves along a partition wall $i^3$ and in the direction of the arrows shown in Figs. 3 and 4, the main part being branched off and flowing forward through a passage $f^3$, until it is mixed with the gas mixture coming through the passage $a^3$ and produces a flame which always has the same direction and flows through the hearth chamber of the furnace. The remaining part of the air flows around the partition wall $i^3$ and in the direction of the arrow shown in Fig. 4, until it is admitted through an opening $e^1$ into the regenerator $c^3$ which is just being heated. Within the said regenerator the air is mixed with a part of the gas which flows through a vertical passage $g^3$, so that also in this case apart from the flame heating the hearth chamber of the furnace a flame is produced for heating the regenerators. After the flow of the air has been reversed, the same operation is repeated in a symmetrical way. The air rises from the regenerator $c^3$ and gives off a part of its volume which is admitted through the passage $g^3$ to the gas passage $a^3$ for starting combustion within the latter, while the main body of air flows along the partition $i^3$ and gets through the passage $f^3$ into the furnace where it forms a flame in the same direction as before. The remaining part of the air flows around the partition $i^3$ and gets through a passage $g^1$ into the regenerator $b^3$, while receiving through passage $e^3$ so much fresh gas as is necessary for reheating the cooled regenerator $b^3$. Also in this case by alternately closing the passages $e^3$ and $g^3$ by means of valves 32 the flame for starting combustion may be omitted.

In Figs. 6 to 10 I have shown two examples in which both the current of gas and the current of air are simultaneously divided. In these examples the small flame which in the examples so far described is used for starting combustion of the body of gas is omitted.

In the example shown in Figs. 6 and 7 the gas and air passages are disposed in a similar way as in the example shown in Figs. 1 and 2. For preheating the air regenerators 1 and 2 are provided, while the gas regenerators for preheating the gas have been indicated by the numerals 3 and 4. The air passage 5 is located above the gas passage 6. The air moves upward, for example from the regenerator 1 and in the direction of the arrow shown in Fig. 6, and it gives off a small part of its volume through a small passage 7 for reheating the gas regenerator 3. While the air is moving farther upward, the main part of the heated air is branched off and flows through a passage 8 to the furnace. The remaining part of the air flows on in the direction of the arrow, until it is admitted into the regenerator 2 which is being reheated, after having received a small supply of gas through a small passage 9, so that also in this case a flame is produced for heating the regenerator 2. The current of gas is moving in the opposite direction. The fresh gas comes from the regenerator 4 and immediately gives off a part of its volume which flows through the passage 9 and into the regenerator 2. The main body of the gas flows through a passage 10 and into the furnace, where it is admixed with the air coming from the passage 8 and forms therewith a flame which has always the same direction. The remaining part of the gas moves onward and in the direction of the arrow and is admitted together with a small supply of air flowing through passage 7 to the regenerator 3 which is being reheated. Valves 11 and 15 are provided for connecting respectively the regenerators 1, 2 and 3, 4. After the operation has been reversed, the currents of gas and air move in the opposite direction, the said currents being branched in the same way as has been described before. It will be understood, that the currents of gas and air must always be opposed to each other.

The by-passes 7 and 9 may be provided with regulating means, such for example as valves 31, or the like.

The example shown in Figs. 8, 9 and 10 is distinguished from the example shown in Figs. 6 and 7 in the same way, as the example shown in Figs. 3 to 5 is distinguished from the example shown in Figs. 1 and 2, the whole difference residing in the fact, that the passages are not vertical, but are provided with bent portions and are disposed parallel to each other and one above the other. The regenerators are disposed in such a way, that at the front side the air regenerators 1' and 2' are located, while at the rear side there are the gas regenerators 3' and 4', or vice versa. In its first part the air passage is directed vertically upward from the regenerator, whereupon it is bent at a right angle. The passage consists of two separate sections which are parallel to each other and are divided by a partition 12', and which are connected at their front ends by a branch 8' which is connected with the furnace. From the ascending current of air immediately after leaving the regenerator a part is branched off which flows through a by-pass 7' and is used for heating the gas regenerator 3', as is indicated in Fig. 8 by the arrow shown in full lines. The current of air moves through a passage 5' and along the partition 12' and gives off its main body through the passage 8' for forming the regenerative flame which always flows in the same direction through the furnace. The remaining part of the air flows around the partition 12' and in the direction of the arrow shown in Fig. 10 and is admitted to the air regenerator 2' which is being heated, while receiving a supply of fresh gas which moves upward within the regenerator 4' and through a passage 9', in order to produce the flame for reheating the regenerator 2. The current of gas moves upward within the regenerator 4'. Immediately after leaving the said regenerator it gives off a part of its volume through the passage 9', which is combined in the manner described with the remaining part of the air for reheating the regenerator 2'. Thereupon the current of gas moves along the partition 12' which also divides the gas passage 6' into two sections, whereupon the main body flows through a passage 10' and into the furnace for forming a flame therein the direction of which remains the same. The remaining part of the gas flows around the partition 12' and is admitted to the second gas regenerator 3' which receives a supply of fresh air from the adjacent air regenerator 1'. In this case always three flames are formed, one of which is produced by the branches 10' and 8' and forms the flame for heating the furnace, while through the branches always at both sides flames are produced for heating the air and gas regenerators being heated. Also in this case the currents of air and gas are opposed to each other. Valves 11' and 15' are provided for connecting the regenerators 1', 2' and 3', 4' respectively. After reversing the valves the currents of gas and air flow in the directions opposite to the arrows. Also after reversing the valves three flames are produced as has been described.

In the modification shown in Fig. 11 the construction is different from that shown in Fig. 8 only in this respect, that the partition between the regenerators 1' and 3', and 2' and 4' respectively is lower and the vault located above the same extends farther downward, than in the example shown in Fig. 8, so that the part of the air or gas which must be branched off immediately after leaving the regenerator gets immediately into the adjacent regenerator. In some cases it will be advisable to provide valves at these connections of the air and gas passages, by means of which the branch currents of air and gas can be regulated.

In Figs. 12 to 15 I have shown examples in which apart from the supply for gaseous fuel a fire place for solid fuel is provided. In the example shown in the figure the fire place for solid fuel is provided with automatic charging means and with automatic means for withdrawing the slag. The solid fuel is supplied through a funnel 16 from which it falls automatically downward on an inclined grate 30, as is known in the art, until it arrives on a horizontal grate 17. The latter is continuously advanced and removes the slag. It will readily be understood, that the fire place may be constructed in any other suitable way. Laterally of the fire place for solid fuel two air regenerators 18 and 19 are located which are connected with the fire place through passages or flues 20 and 21 respectively, so that the mixture of gas and air and the flame move in the directions indicated in the figures by the arrows. The supply of air can be changed by means of a valve 22. It may be assumed, that the air valve 22 has been set in such a way, that after being heated within the regenerator the air for supporting combustion comes from the regenerator 18 and that the regenerator 19 is being reheated. The hot air flows from the regenerator 18 and through the passages 20 and it gets at first into the fire place, where it is admixed to the gas and flows in the direction of the arrows 23 and into the hearth chamber of the furnace, so as to form therein a flame the direction of which remains the same during the whole operation of the furnace. A part of the air and a part of the gas produced within the fire place flow in the direction of the arrow 24 and into the regenerator 19 so as to heat the latter.

If the air valve 22 is reversed, the currents of air and gas flow in the opposite direction. The heated air rises within the regenerator 19 and flows through the passage 21 and into the fire place. Within the latter it is combined with the larger part of the gases developed from the solid fuel and forms therewith a flame which always moves in the same direction indicated in Fig. 12 by the arrows 23 and heats the hearth chamber, while a part of the air and gases moves through the passage 20 in a direction opposite to the arrows shown in Fig. 3 and into the regenerator 18 so as to heat the same.

The example illustrated in Figs. 14 and 15 is distinguished from that shown in Figs. 12 and 13 only in this respect, that the regenerators 18 and 19 are directly connected with each other by a passage 25. While in the example shown in Figs. 12 and 13 the air for supporting combustion within one of the regenerators must traverse the fire place, Figs. 14 and 15 show the said regenerators as directly communicating with each other, so that the air for heating one of the regenerators is directly admitted from the other regenerator. This construction will be provided in such cases, where the flame for heating the regenerators has otherwise an undesirable reducing action, or in other words, where the combustible mixture contains too much gas, and the flame produced thereby is not clear.

The connection between the regenerators may be made in different ways. It is not always necessary, that the said passage be distinct from the fire place, as has been shown in the figures. It will be understood, that the said connection between the regenerators is only a subsidiary means for producing complete combustion of all the branches of the flame, and for avoiding, that one of the branches burns with an oxidizing flame and another one with a reducing flame. The same result may in some cases be obtained by regulating the draft in the flues and passages, in which cases a furnace of the construction shown in Figs. 12 and 13 will be sufficient. In furnaces which are provided with a broad fire place similar means, that is a connection between the regenerators located above the fire place or a cavity or hollow formed in the vault, may be provided for uniformly distributing the air for supporting combustion within the furnace over the broad cross-sectional area of the furnace.

In the construction shown in Figs. 14 and 15 the cross-sectional area of the passage 25 may be varied and this may be done for example by placing into the passage bricks of refractory material, which may be done through blind doors 26.

While in the examples illustrated in Figs. 12 to 14 the regenerators are located at opposite sides of the fire place. I wish it to be understood, that my invention is not limited to the construction shown in the figures and that the regenerators may be located at other parts of the furnaces, according to local conditions.

I claim herein as my invention:

1. In a regenerative furnace, means for supplying air and means for supplying gas to the furnace hearth, one of said means being a regenerative system, and by-pass means for supplying to a portion of said system both regenerated air and gas.

2. In a regenerative furnace, means for supplying air and means for supplying gas to the furnace hearth, one of said means being a regenerative system, by-pass means for supplying to a portion of said system both air and gas, and by-pass means to supply a portion of the air from the air supply means to the gas supply means before reaching the hearth of the furnace.

3. In a regenerative furnace, a regenerative air-supply system for supplying regenerated air to the furnace hearth, gas supply means for supplying gas to the hearth, and by-pass means for returning a portion of the air and gas to a portion of the regenerative system.

4. In a regenerative furnace, a regenerative air supply system for supplying heated air to the furnace hearth, a gas supply means for supplying gas to the hearth, by-pass means to supply a portion of the air to the gas-supply means and by-pass means to supply both air and gas for heating a portion of the regenerative system.

5. In a regenerative furnace, an air supply system and a gas supply system, both supplying regenerated air and gas media to one end of the furnace hearth under all conditions of operation, and by-pass means to supply a portion of the medium from one of said systems to the other.

6. In a regenerative furnace, gas producing means and a regenerative air heating system, both supplying air and gas to one end of the furnace hearth under all conditions of operation, and by-pass means from one portion of the regenerative system and from the gas producing means to supply regenerated air and gas to heat the other portion of said system.

In testimony whereof I hereunto affix my signature in the presence of two witnesses.

FRIEDRICH SIEMENS.

Witnesses:
   HENRY HASPER,
   WOLDEMAR HAUPT.